United States Patent [19]
Beckwith

[11] Patent Number: 5,615,292
[45] Date of Patent: Mar. 25, 1997

[54] FIBER OPTIC TERMINATOR WITH ELECTRICAL INPUT/OUTPUT

[76] Inventor: Robert W. Beckwith, 2794 Camden Rd., Clearwater, Fla. 34619

[21] Appl. No.: 386,748

[22] Filed: Feb. 10, 1995

[51] Int. Cl.⁶ ........................................... G02B 6/36
[52] U.S. Cl. ................................. 385/89; 385/92
[58] Field of Search .............................. 385/88–94

[56] References Cited

U.S. PATENT DOCUMENTS

| | | | |
|---|---|---|---|
| 5,109,447 | 4/1992 | Chan | 385/89 |
| 5,337,388 | 8/1994 | Jacobowitz et al. | 385/89 |
| 5,367,593 | 11/1994 | Lebby et al. | 385/53 |
| 5,396,573 | 3/1995 | Ecker et al. | 385/88 |
| 5,475,778 | 12/1995 | Webb | 385/89 |

*Primary Examiner*—John Ngo
*Attorney, Agent, or Firm*—Leo J. Aubel

[57] ABSTRACT

A terminator for permanent connection to either end of a fiber optic cable which then provides transmission of electrical TTL logic signals from one end to the other.

5 Claims, 3 Drawing Sheets

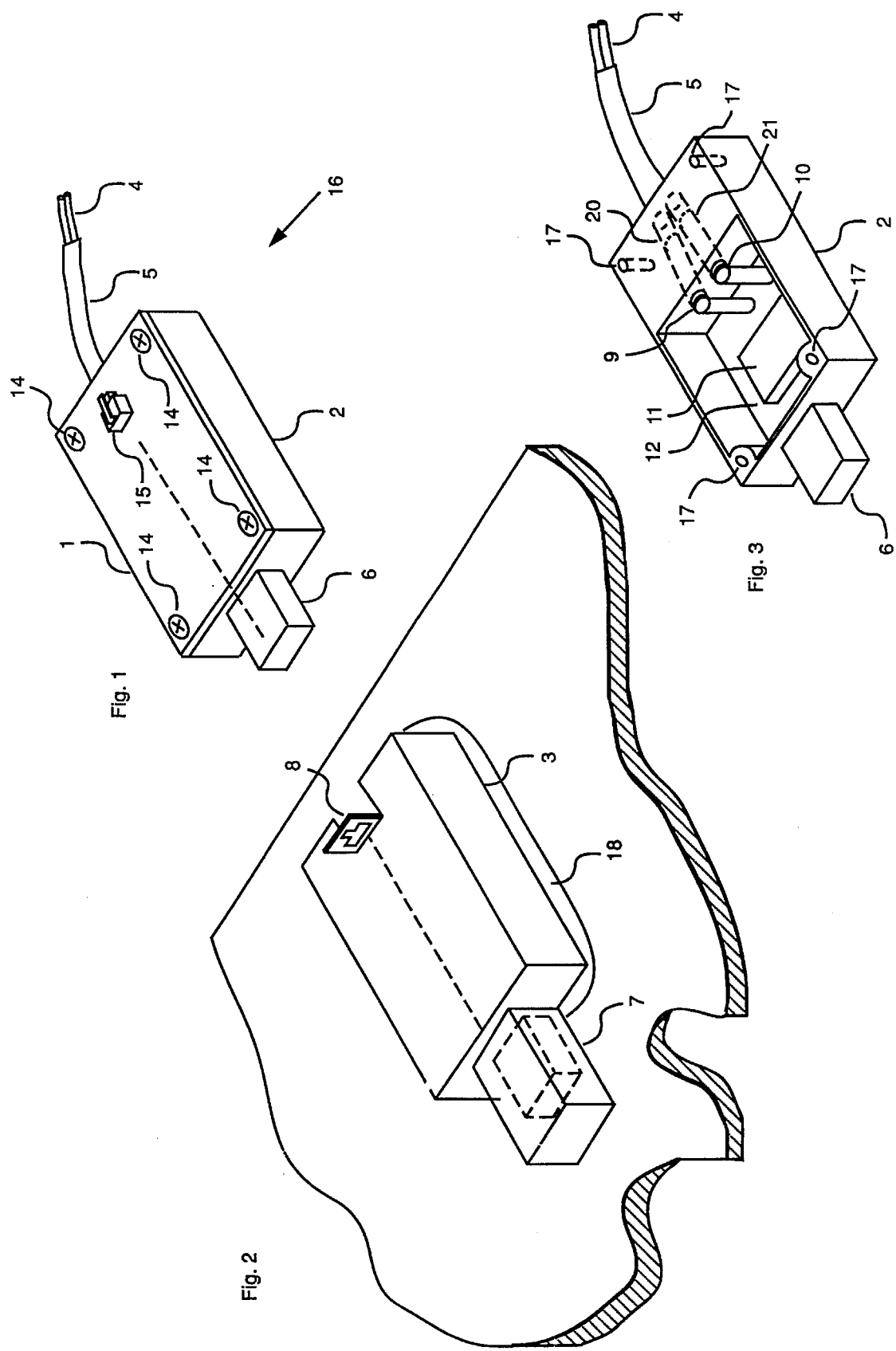

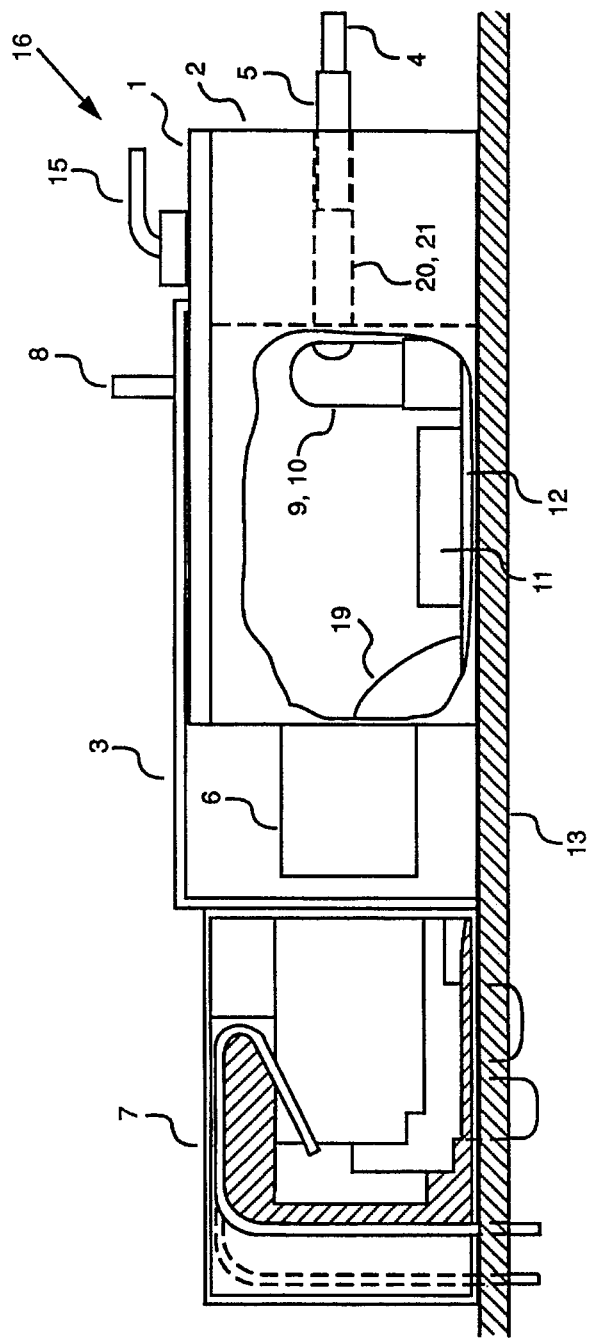
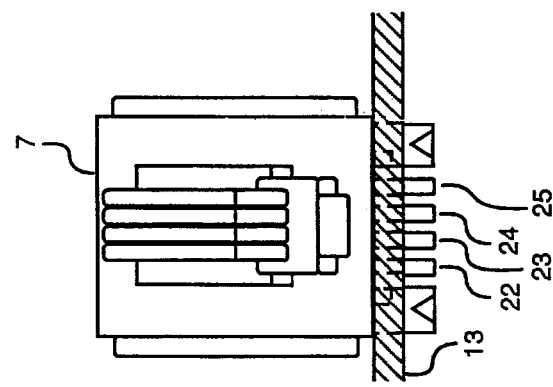
Fig. 4 a)
Fig. 4 b)

5,615,292

FIBER OPTIC TERMINATOR WITH ELECTRICAL INPUT/OUTPUT

BACKGROUND OF THE INVENTION

Fiber optic cables are used in electric utility substations and generating plants to carry digital data between pieces of equipment. Since the fiber optic cables are electrically insulating, their use eliminates the pick up of electrical noise signals from the switching of electric power circuits and from the very high point to point voltages created in a substation or generating plant by an electrical ground fault or lightning strike within the facility.

Fiber optic cables are also used in computer networks, climate control systems to carry digital signals from point to point within a building, and in extended manufacturing or military facilities, again to give freedom from induced electrical noise and protection from lightning strikes. Fiber optic cables are used to carry digital control signals in the Boeing 777 aircraft for the same reasons as above. Use of such fiber optic cables creates problems, however, not found in using metallic conductors for signal transmission, that are common regardless of where the fiber optic cables are used.

Fiber optic cables are usually terminated using a two part coupler, one fastened to the end of the cable and the other mounted on a piece of equipment. When mated, the two parts of the coupler position the end of a fiber to accept light from a light sender or to detect light coming from the end of a fiber by a light receiver. Most optical fiber lines carry light in only one direction and two lines are commonly joined side by side for two directional data transfer. Depending on the diameter of the glass or plastic fiber within the line, the couplers may require considerable precision and are quite expensive. Preparing an optic fiber line in the field and attaching one portion of the coupler can be especially difficult if glass fibers are used, requiring light measurements to assure good light transference.

Moreover, couplers for glass fiber lines differ from those for plastic lines. Devices which are to be used with glass fibers lines for long distance data transmission must, therefore have a different coupler than when used with plastic fiber lines for short distance data transmission. This difference results in added cost of manufacture, stocking, sales, and use of the device. Moreover, if the use of digital communications is optional, the manufacturer of the device must either install transmitting and receiving couplers and associated circuitry which may never be used for some customers of the device or manufacture two form of the device, one with and one without the provision for fiber optic communications.

Another problem for a manufacturer is that some customers, not wishing to use fiber optic cables, may require one of several types of electrical outputs for wire transmission of digital data.

Most microprocessors operate with a power supply of either +5 volts dc or +3 volts dc. Digital data is most readily available from devices using such microprocessors in signals going from zero volts to either +3 or +5 volts. From early use of circuitry having individual transistors, the term 'transistor/transistor logic' (TTL) is commonly used to describe such circuits or signals.

SUMMARY OF THE INVENTION

A terminator device combining all components required at either end of a fiber optic cable in order to send electrical digital signals over the cable. The components are placed in bodies with covers forming a single unit. Cables of various lengths are manufactured with terminators permanently fastened to each end of a cable. In the field, terminated cables are laid in cable runs and the terminators easily plugged into terminator retention boxes.

The foregoing features and advantages of the present invention will be apparent from the following more particular description. The accompanying drawings, listed hereinbelow, are useful in explaining the invention.

DESCRIPTION OF THE DRAWINGS

FIG. 1 is an isometric view of the terminator;

FIG. 2 is an isometric view of a retention box for the terminator;

FIG. 3 is a view of a bidirectional terminator with cover removed;

FIG. 4 is a detailed end view of telephone type connector used with the retention box and with a terminator partially inserted in the box;

DESCRIPTION OF THE INVENTION

Figure 5:
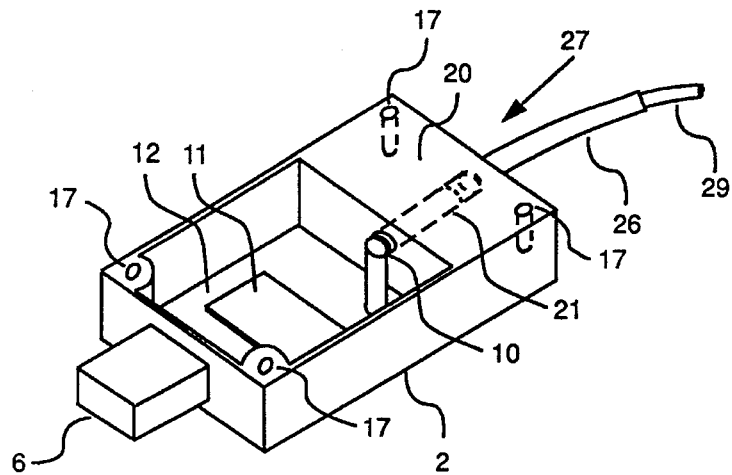
FIG. 5 is an isometric view of a one way receiving terminator.

FIG. 1 shows the inventive terminator 16 for use at each end of a two line fiber optic cable 4 as required for two way digital communications. The combination of a body 2, a cover 1 for body 2 and the contents of body 2 forms the terminator 16. The body 2 is preferably made of nonconducting plastic to avoid static charges from being discharged from a person inserting or removing terminator 16 with sensitive circuits connected to the electrical terminals 22, 23, 24 and 25, see also FIG. 4a). Cover 1 is fastened to body 2 by four screws 14 inserted in holes 17 in the cover and body. A male telephone connector 6, similar to the familiar connector found on telephone cords except with the retainer clip omitted extends from body 2. A retainer clip 15 for body 2 is a part of cover 1.

Referring now to FIG. 2, electrical devices requiring fiber optic digital communications are provided with a retention box 3 into which the terminator is inserted, making connections between connectors 6 and 7. When the terminator 16 is plugged into box 3, retainer clip 15 engages and is held by protrusion 8 on box 3. Retention box 3 is preferably made of metal to provide shielding for sensitive circuitry within terminator 16. Box 3 is preferably mounted so as to be connected to a ground surface on printed circuit board 13 for safe static charge grounding in an event of human contact with a box 3.

Referring now also to FIG. 3, flexible tubing 5 provides strain relief for fiber optic cable 4; both tubing 5 and cable 4 being retained in openings 20 and 21 in body 2. Body 2 is shown with cover 1 removed as required to permit assembly within body 2 of a known type of light sender 9 such as a Hewlett Packard HFBR1528, a known type of light receiver 10 such as a Hewlett Packard HFBR2528, and associated circuit 11 on printed circuit board 12. Circuit 11 converts TTL incoming signals from terminal 23 of connector 7 to light signals for sending outward on a first line of cable 4 and converts light signals received on the second line of cable 4 to TTL signals outward from terminal 24 of connector 7. One terminal 22 of connector 7 provides a circuit ground for terminator 16 and another terminal 25 provides 3 to 5 volts dc as a power source for components within terminator 16. Note that the assignment of functions of the four terminals of connector 7 is for purposes of explanation only.

Refer now also to FIG. 4a which shows an end view of connector 7 mounted on printed circuit board 13. FIG. 4b shows a side view of connector 7 mounted on printed circuit board 13 together with a cross section of retainer box 3 also mounted on printed circuit board 13. Box 3 is connected to printed circuit board 13 foil 18 extending under box 3. The terminator 16 is shown inserted into box 3 in position for connector 6 to enter connector 7 and for retainer clip 15 to be secured by protrusion 8 on box 3. Terminator 16 contains circuit 11, light sender 9 and light receiver 10 mounted on printed circuit board 12 with four leads 19 connecting from printed circuit board 13 to connector 6, terminals 22, 23, 24 and 25.

Refer now also to FIG. 5 which shows a single fiber optic line 29, using strain relief flexible tubing 26, fastened in opening 21 of body 2. Light receiver 10 together with circuit 11 converts received digital signals from the line 29 into electrical digital signals which are coupled outwardly from terminal 24 of connector 7.

Figure 6:
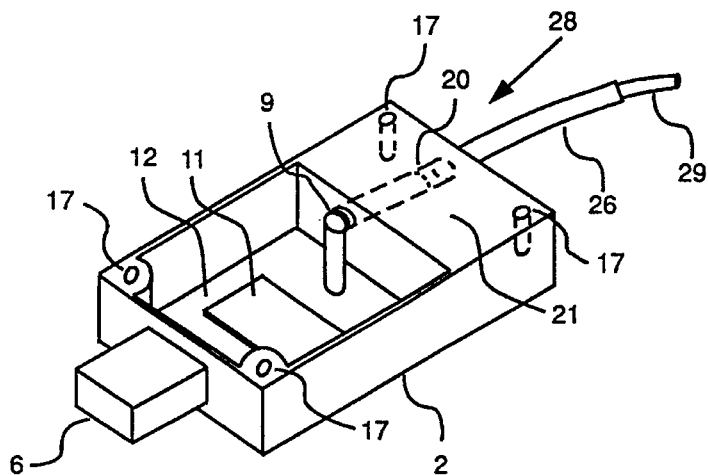
FIG. 6 is an isometric view of a one way transmitting terminator.

Refer now also to FIG. 6 which shows a single fiber optic line 29, using strain relief flexible tubing 26, fastened in opening 20 of body 2. Light sender 9 together with circuit 11 converts digital signals from terminal 23 of connector 7 into light signals which are coupled outwardly on fiber optic line 29.

Figure 7:
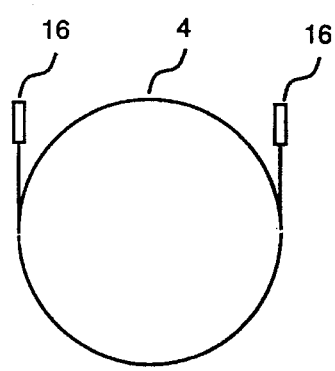
FIG. 7 shows a coil of fiber optic cable terminated for bidirectional data transmission.

Refer now also to FIG. 7 which shows an assembly of two terminators 16 on a coiled length of double line fiber optic cable 4 for bidirectional transmission of digital data.

Figure 8:
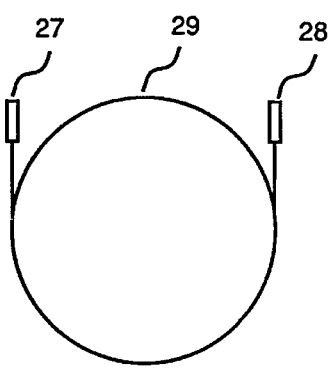
FIG. 8 shows a coil of fiber optic cable terminated for one way data transmission.

Refer now also to FIG. 8 which shows an assembly of transmitting terminator 28 (of FIG. 6) on a first end of a coiled length of single line fiber optic cable and receiving terminator 27 (of FIG. 5) on the second end of the cable for transmission of digital data from the first to the second end of the line.

ADVANTAGES OF INVENTION

1) Fiber optic cables can be terminated in a factory eliminating the need for optic work in the field.

2) Terminated cables can be tested electrically, for example, after manufacture, before installation, or to locate trouble in the event of a failure of digital communications.

3) The cost of equipment is decreased where the use of a fiber optic communications cable is optional.

4) A variety of fiber optic cables can be used without the requirement for making changes in a device which uses the cables.

While the invention has been particularly shown and described with reference to a preferred embodiment thereof, it will be understood by those skilled in the art that various changes in form and in details may be made therein without departing from the spirit and scope of the invention. For example, other connectors than the telephone type may be used in the present invention.

What I claim is:

1. A universal pluggable terminator device for optical cables, said terminator device including all components required at either end of each of a pair of fiber optic cables to enable transmission of digital signals in either one of two directions over the cables, a terminator device being affixable to each of the ends of said pair of cables, each said terminator device comprising in combination:

a) a non-conductive body;

b) means for fixedly connecting an end of a cable to said body;

c) cooperating light sending and light receiving means mounted in said body;

d) electronic circuit means mounted in said body for selectively converting electrical digital signals to light signals as an output, and for converting incoming light signals to electrical digital signals as an input; and, e) said terminator devices affixed to the ends of said cables being essentially identical, and selectively functioning either as input terminals and output terminals for the associated cables.

2. Apparatus as in claim 1 further including a retention box for receiving a respective terminator device, said box including:

a) first contact means for connection to a DC reference voltage, a second contact means for connecting to a positive DC voltage supply, a third contact means for a coupling incoming signals from said cables via said circuit means, and a fourth contact means for coupling output signals to said cables via said circuit means;

b) said terminator device having a male connector member connecting to said electronic circuit means and extending outwardly from said body, and said connector member having contact means compatible with said first, second, third and fourth contact means in said box; and, c) said male connector member being engageably receivable in said retention box.

3. Apparatus as in claim 2, further comprising a pair of optical signal conducting cables coupled to an associated electronic equipment, with one cable of said pair providing an input signal to said equipment and the other of said cables providing an output signal from said equipment;

a) a first terminator device connected to the first end of the first cable of said pair, said first terminator device having a light conversion means positioned to couple said third contact means of said retention box to said first cable for connecting incoming optical signals into said equipment; and b) a second terminator device connected to the same first end of the second cable of said pair, said second terminator device having a light conversion means positioned between said fourth contact means of said retention box to said second cable for connecting output optical signals out of said equipment.

4. A method of communicating between electrical equipment using digital signals in TTL form and having electrical communications sockets and requiring fiber optic digital communications, said method comprising the steps of:

a) attaching terminators to ends of pairs of fiber optic cables, b) converting light signals to TTL digital electrical signals using first converters within said terminators, c) converting TTL digital electrical signals to light signals using second converters within said terminators, d) connecting said TTL digital electrical signals to plugs on said terminators, d) sending and receiving TTL digital electrical signals by inserting said plugs on said terminators into said sockets, and e) powering said converters with direct current obtained from said sockets upon inserting said plugs into said sockets.

5. A method as in claim 4 further including the steps of:

a) providing conducting guides for said terminators, and b) connecting said conducting guides to circuit grounds so as to provide electrical shielding for said converters.

* * * * *